United States Patent
Fügel et al.

(10) Patent No.: US 10,196,831 B2
(45) Date of Patent: Feb. 5, 2019

(54) VEHICLE-MOUNTED CONCRETE PUMP

(71) Applicant: Putzmeister Engineering GmbH, Aichtal (DE)

(72) Inventors: Dietmar Fügel, Wolfschlugen (DE); Michael Senft, Filderstadt (DE); Matthias Braun, Stuttgart (DE)

(73) Assignee: PUTZMEISTER ENGINEERING GMBH, Aichtal (DE)

( * ) Notice: Subject to any disclaimer, the term of this patent is extended or adjusted under 35 U.S.C. 154(b) by 103 days.

(21) Appl. No.: 15/344,540

(22) Filed: Nov. 6, 2016

(65) Prior Publication Data

US 2017/0051520 A1    Feb. 23, 2017

Related U.S. Application Data

(63) Continuation of application No. PCT/EP2015/059660, filed on May 4, 2015.

(30) Foreign Application Priority Data

May 6, 2014    (DE) .................. 10 2014 208 472

(51) Int. Cl.
*E04G 21/04*    (2006.01)
*B60P 3/16*    (2006.01)

(52) U.S. Cl.
CPC ............ *E04G 21/0445* (2013.01); *B60P 3/16* (2013.01); *E04G 21/0436* (2013.01)

(58) Field of Classification Search
CPC ..... E04G 21/0436; E04G 21/0445; B60P 3/16
(Continued)

(56) References Cited

U.S. PATENT DOCUMENTS 4,619,369 A * 10/1986 Mertens .............. E04G 21/0436
                                                              212/304
6,378,686 B1 * 4/2002 Mayer ..................... B65G 21/14
                                                              198/314
(Continued)

FOREIGN PATENT DOCUMENTS

CN    201424817 Y    3/2010
CN    201818056 U    5/2011
(Continued)

OTHER PUBLICATIONS

English translation of International Preliminary Report on Patentability and Written Opinion of the International Searching Authority, PCT/EP2015/059660, dated Nov. 17, 2016.

*Primary Examiner* — Michael Safavi
(74) *Attorney, Agent, or Firm* — Bose McKinney & Evans LLP

(57) ABSTRACT

Disclosed is a vehicle-mounted concrete pump comprising a vehicle and a concrete distributor boom which can be transported thereon and which is mounted on a boom pedestal in such a way as to be able to rotate about a vertical axis and in such a way as to be able to pivot about a horizontal axis, wherein the boom pedestal is held on profile supports of an installation frame on the vehicle via connecting means. According to the disclosure, it is proposed that a screw attachment bar is arranged as connecting means between the boom pedestal and each profile support, wherein the screw attachment bar has, distributed over its length, a plurality of assembly recesses and screw channels opening into the latter for screw connections to the profile support.

18 Claims, 2 Drawing Sheets

(58) Field of Classification Search
USPC .................................... 248/346.01, 346.02
See application file for complete search history.

(56) References Cited

U.S. PATENT DOCUMENTS

| | | | |
|---|---|---|---|
| 7,654,800 B2* | 2/2010 | Leibbrand | B60P 3/16 |
| | | | 280/763.1 |
| 2004/0090036 A1* | 5/2004 | Schillinger | B60R 3/00 |
| | | | 280/166 |
| 2005/0271522 A1 | 12/2005 | Leibbrand et al. | |
| 2006/0043718 A1* | 3/2006 | Mayer | B66C 23/80 |
| | | | 280/763.1 |
| 2007/0020117 A1* | 1/2007 | Schuran | E04G 21/0436 |
| | | | 417/234 |
| 2014/0246101 A1* | 9/2014 | Trumper | E02F 9/123 |
| | | | 137/355.24 |
| 2015/0316043 A1* | 11/2015 | Braun | E04G 21/04 |
| | | | 417/437 |

FOREIGN PATENT DOCUMENTS

| | | |
|---|---|---|
| CN | 202370261 U | 8/2012 |
| DE | 27 24 810 A1 | 12/1978 |
| DE | 76 23 378 U1 | 8/1979 |
| DE | 31 22 725 A1 | 12/1982 |
| DE | 10 2007 060 526 A1 | 6/2009 |
| DE | 10 2009 047 458 A1 | 6/2011 |
| EP | 1 355 820 B1 | 8/2004 |
| WO | WO 2004/033822 A1 | 4/2004 |

* cited by examiner

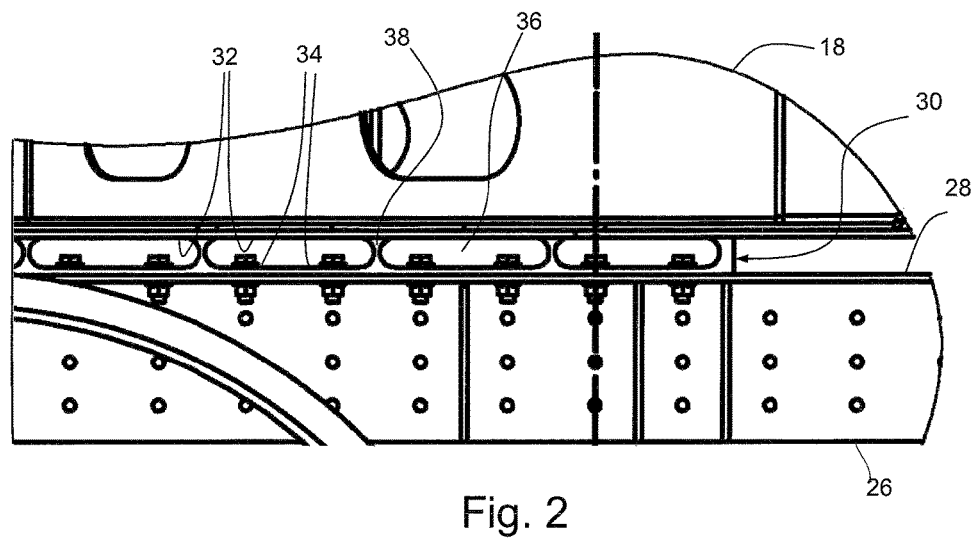
Fig. 2
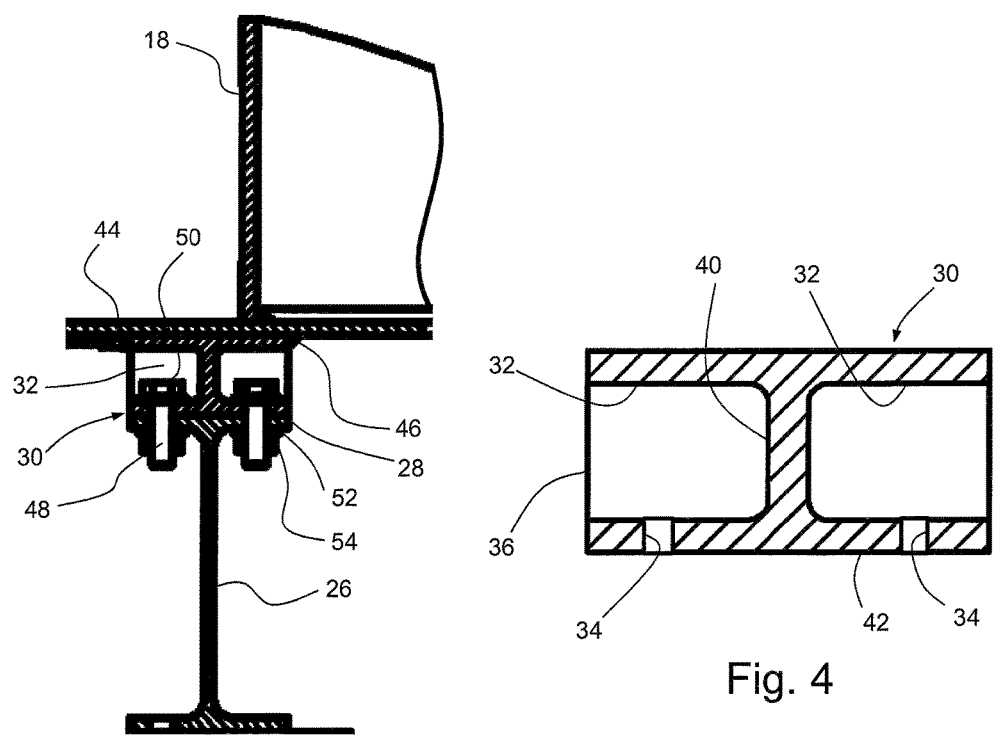
Fig. 3
Fig. 4

VEHICLE-MOUNTED CONCRETE PUMP

RELATED APPLICATIONS

This application is a continuation of PCT/EP2015/059660, filed May 4, 2015, which claims priority to DE 10 2014 208 472.5, filed May 6, 2014, both of which are hereby incorporated herein by reference in their entireties.

BACKGROUND

The invention relates to a vehicle-mounted concrete pump having a vehicle and a concrete distribution boom which can be transported thereon and which is supported on a boom pedestal so as to be able to be rotated about a vertical axis and so as to be able to be pivoted about a horizontal axis, wherein the boom pedestal is retained via connection means on a plurality of profile carriers, preferably two parallel I-shaped profile carriers, of a structural frame which is secured to the vehicle.

In the conventional construction of a vehicle-mounted concrete pump there is placed on the vehicle chassis which is, for example, formed by C-shaped longitudinal and transverse carriers, a so-called structural frame which comprises I-shaped profile carriers which are screwed at the lower flange thereof to the chassis. Furthermore, there is located thereabove an additional I-shaped profile rod as a carrier for the boom pedestal whose casing closed at the base side provides no further connection possibilities. Such I-shaped steel carriers are, however, available only in standard sizes so that the structural space which is available at the top for the boom pedestal is accordingly limited by the steel carrier height.

SUMMARY

This disclosure teaches an improved construction of vehicle-mounted concrete pumps and provides a construction which is optimized both in terms of the use of structural space and stability and the ease of assembly and repair.

This disclosure is based on the notion of enabling a screw connection of the boom pedestal with the smallest possible structural height. Accordingly, it is proposed according to this disclosure that at least one screw-mounting bar be arranged as a connection means between the boom pedestal and each profile carrier, wherein the screw-mounting bar has distributed over the length thereof a plurality of assembly recesses and screw channels which open therein for screw connections with respect to the profile carrier. As a result of such a plate-like bar, in comparison with a conventional I-shaped profile carrier with a smaller height, a comparable stability can be ensured, wherein the recesses for the assembly and the use of the screws for the intended purpose can be sized with adequate load resistance. In this manner, the following advantages can be achieved:
  with a reduced height of the screw-mounting bar, the height of the boom pedestal can be accordingly increased, without exceeding the structural space available in an upward direction. The resistance torque of the pedestal can thereby advantageously be increased;
  in the final assembly, a welding operation is no longer carried out, but instead only a screwing operation and where applicable a bolting operation. The assembly can thereby be carried out in a more rapid and cost-effective manner;
  fewer occurrences of distortion since a welding operation is no longer carried out;
  the boom pedestal subassembly becomes smaller and can be more readily transported and kept in situ;
  the replacement of the boom pedestal is simplified.

Advantageously, in the context of optimized use of structural space, the width of the screw-mounting bar is greater than the height of the screw-mounting bar protruding above the profile carrier.

In order to facilitate assembly, it is advantageous for the assembly recesses to be accessible at a free longitudinal side of the screw-mounting bar via an access opening and to be closed as pockets at the base side.

Another improvement makes provision for the assembly recesses to be introduced along the screw-mounting bar at both sides in a mirror-symmetrical manner relative to each other.

In order to ensure a high level of component stability, the depth of the assembly recesses is intended to be less than half the width of the screw-mounting bar so that in any case a central web is retained. It is also advantageous for the assembly recesses to be separated from each other by means of transverse webs of the screw-mounting bar.

In order to allow sufficient assembly freedom, it is advantageous for the assembly recesses to have when viewed in the longitudinal direction of the screw-mounting bar an elongate hole cross-section and to communicate in each case with at least two screw channels.

In another advantageous embodiment, there is provision for the vertically extending screw channels to extend through a base face of the screw-mounting bar positioned on the profile carrier.

A screw assembly can advantageously be configured in that the connection means comprise screws which are inserted into the screw channels and whose screw head is arranged in an assembly recess and whose screw shaft engages through a hole of a flange of the profile carrier. A transposed orientation of the screws is also conceivable.

For secure pre-fixing, it is advantageous for the screw-mounting bar to be welded or screwed at the upper side thereof to a base wall of the boom pedestal.

An embodiment which is advantageous in terms of production and stability which can be achieved makes provision for the screw-mounting bar to be formed as a flat rod from a solid material, in particular from construction steel, wherein the assembly recesses are milled laterally in the flat rod.

In order to prevent torsion of the substructure during travel and work operation, it is advantageous for the pedestal to be supported by means of at least one strut at the rear side on the vehicle, wherein the strut is screwed to a profile carrier by means of an end-side strut fitting so that simplification of assembly is also achieved at this location.

It is also conceivable for the screw-mounting bar to be composed of a plurality of individual bar portions, wherein the bar portions each have at least one assembly recess and at least one screw channel which opens therein for screw connection to the profile carrier. The bar portions which are arranged where applicable with spacing from each other thus complement each other in the assembled state in functional terms as a screw-mounting bar, wherein the bar portions are securely fitted to a base wall of the boom pedestal.

BRIEF DESCRIPTION OF THE DRAWINGS

The above-mentioned aspects of exemplary embodiments will become more apparent and will be better understood by reference to the following description of the embodiments taken in conjunction with the accompanying drawings, wherein:

FIG. 2 is an enlargement of a cut-out of a screw-mounting bar in the region II of FIG. 1;

FIG. 3 is a section along the dot and dash line of FIG. 2; and

FIG. 4 is a cross-section of the screw-mounting bar.

DESCRIPTION

Figure 1:
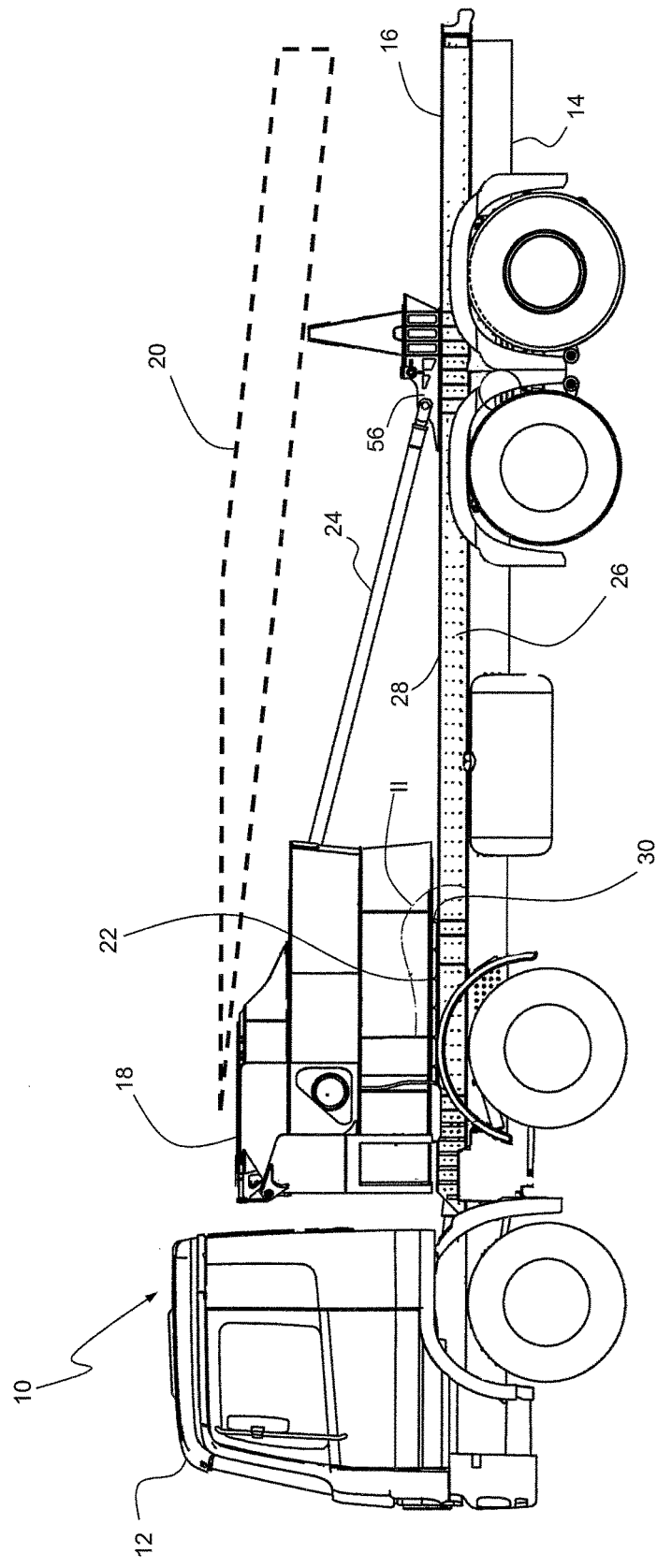
FIG. 1 is a side view of a vehicle-mounted concrete pump with a schematically indicated concrete distribution boom.

The embodiments described below are not intended to be exhaustive or to limit the invention to the precise forms disclosed in the following description. Rather, the embodiments are chosen and described so that others skilled in the art may appreciate and understand the principles and practices of this disclosure.

The terms "horizontal" and "vertical" are generally used herein to establish positions of individual components relative to one another rather than an absolute angular position in space. Further, regardless of the reference frame, in this disclosure terms such as "vertical," "parallel," "horizontal," "right angle," "rectangular" and the like are not used to connote exact mathematical orientations or geometries, unless explicitly stated, but are instead used as terms of approximation. With this understanding, the term "vertical," for example, certainly includes a structure that is positioned exactly 90 degrees from horizontal, but should generally be understood as meaning positioned up and down rather than side to side. Other terms used herein to connote orientation, position or shape should be similarly interpreted. Further, it should be understood that various structural terms used throughout this disclosure and claims should not receive a singular interpretation unless it is made explicit herein. By way of non-limiting example, the terms "profile carrier," "assembly recess," and "screw channel," to name just a few, should be interpreted when appearing in this disclosure and claims to mean "one or more" or "at least one." All other terms used herein should be similarly interpreted unless it is made explicit that a singular interpretation is intended.

The vehicle-mounted concrete pump 10 shown in FIG. 1 comprises a transport vehicle 12 having a carrier frame 14 and a structural frame 16, a boom pedestal 18 and a concrete distribution boom 20 which is supported on the boom pedestal so as to be able to be rotated about a vertical axis and so as to be able to be pivoted about a horizontal axis and which comprises a plurality of boom arms which can be folded as an arm assembly for conveying liquid concrete to a concreting region which is remote from the vehicle, wherein the boom pedestal 18 is fixed to the substructure thereof by means of connection means 22 (also referred to herein as "connector") and to the structural frame 16 which is secured to the vehicle at the rear side by means of struts 24.

The structural frame 16 comprises two I-shaped profile carriers 26 which extend parallel with each other in the longitudinal direction of the vehicle. These carriers are provided at the upper flange 28 thereof with holes for screwing the connection means 22, as explained in greater detail below.

As can also be seen in FIG. 2, a screw-mounting bar 30 is provided in each case as a connection means 22 between the boom pedestal 18 and the two I-shaped profile carriers 26 (or double T-shaped profile carriers). The screw-mounting bars 30 are constructed in a plate-like or elongate/flat manner so that the width thereof is greater than the height thereof which protrudes above the I-shaped profile carriers 26. They have in a state distributed over the length thereof a plurality of assembly recesses 32 and screw channels 34 which open therein for screw connections with respect to the profile carrier 26.

The assembly recesses 32 have when viewed in the longitudinal direction of the screw-mounting bar 30 an elongate hole cross-section and enable via an opening 36 at a free longitudinal side of the screw-mounting bar 30 an engagement with respect to two screw channels 34, respectively. In this instance, the assembly recesses 32 are separated from each other by means of transverse webs 38 of the screw-mounting bars 30.

As can best be seen in FIGS. 3 and 4, the assembly recesses 32 are closed as pockets at the base side and introduced along the screw-mounting bar 30 at both sides in a mirror-symmetrical manner relative to each other, wherein the depth is less than half the width of the screw-mounting bar 30 so that a central web 40 is retained.

Advantageously, the screw-mounting bars 30 comprise a flat rod construction steel in which the assembly recesses 32 are milled at both sides from the flat sides. The screw channels 34 which extend vertically in the assembly state are then drilled from the base side 42 of the screw-mounting bars 30 so that they open in the assembly recesses 32.

Each screw-mounting bar 30 is securely fixed at the upper side thereof to a base wall 44 of the boom pedestal 18 by means of weld connections 46 (FIG. 3). It is also conceivable to provide holes for screwing to the boom pedestal so that an assembly of components which have already been painted is also readily possible. The connection to the I-shaped profile carrier is produced by means of screws 48 which are introduced into the screw channels 34 and whose screw head 50 is arranged in the assembly recess 32 and whose screw shaft engages through an aligned hole 52 of the flange 28 of the profile carrier 26 and a counter-nut 54. In addition to the screw assembly of the pedestal 18 at the base side, the two struts can also be screwed to the profile carriers 26 by means of an end-side strut fitting 56. During the final assembly operation, a welding operation is no longer carried out but instead only a screwing operation, or the strut 24 is bolted to the pedestal 18 and strut fitting 56.

While exemplary embodiments have been disclosed hereinabove, the present invention is not limited to the disclosed embodiments. Instead, this application is intended to cover any variations, uses, or adaptations of this disclosure using its general principles. Further, this application is intended to cover such departures from the present disclosure as come within known or customary practice in the art to which this invention pertains and which fall within the limits of the appended claims.

What is claimed is:

1. A vehicle-mounted concrete pump, comprising:
   a vehicle;
   a structural frame secured to the vehicle and having a profile carrier;
   a concrete distribution boom which can be transported on the vehicle;
   a boom pedestal supporting the concrete distribution boom, wherein the concrete distribution boom is rotatable about a vertical axis and pivotable about a horizontal axis;
   a screw-mounting bar arranged between the boom pedestal and the profile carrier, wherein the screw-mounting bar has distributed over the length thereof a plurality of assembly recesses and screw channels which are accessible from the assembly recesses for screw connections to the profile carrier.

2. The vehicle-mounted concrete pump as claimed in claim 1, wherein the screw-mounting bar has a width that is greater than a height of the screw-mounting bar protruding above the profile carrier.

3. The vehicle-mounted concrete pump as claimed in claim 1, wherein the assembly recesses are accessible at a free longitudinal side of the screw-mounting bar via an access opening and are closed at lateral sides thereof.

4. The vehicle-mounted concrete pump as claimed in claim 1, wherein the assembly recesses are arranged along opposite sides of the screw-mounting bar in a mirror-symmetrical manner.

5. The vehicle-mounted concrete pump as claimed in claim 1, wherein the assembly recesses have a depth that is less than half the width of the screw-mounting bar.

6. The vehicle-mounted concrete pump as claimed in claim 1, wherein the screw-mounting bar comprises transverse webs separating the assembly recesses.

7. The vehicle-mounted concrete pump as claimed in claim 1, wherein the assembly recesses have, when viewed in the longitudinal direction of the screw-mounting bar, an elongate hole cross-section and each assembly recess has at least two of the screw channels positioned therein.

8. The vehicle-mounted concrete pump as claimed in claim 1, wherein the screw channels extend through a base face of the screw-mounting bar.

9. The vehicle-mounted concrete pump as claimed in claim 1, wherein the screw mounting bar comprises screws inserted into the screw channels, each screw having a screw head arranged in a respective assembly recess, the screws each having a screw shaft that engages through a respective hole of a flange of the profile carrier.

10. The vehicle-mounted concrete pump as claimed in claim 1, wherein the screw-mounting bar is welded or screwed at an upper side thereof to a base wall of the boom pedestal.

11. The vehicle-mounted concrete pump as claimed in claim 1, wherein the screw-mounting bar is formed as a flat rod from construction steel and the assembly recesses are milled laterally in the flat rod.

12. The vehicle-mounted concrete pump as claimed in claim 1, wherein the boom pedestal is supported by at least one strut at the rear side on the vehicle, wherein the strut is screwed to the profile carrier by an end-side strut fitting.

13. The vehicle-mounted concrete pump as claimed in claim 1, wherein the screw-mounting bar comprises a plurality of individual bar portions, wherein the bar portions each have at least one of the assembly recesses and at least one of the screw channels.

14. The vehicle-mounted concrete pump as claimed in claim 1, wherein the profile carrier comprises a pair of profile carriers which extend parallel with each other in the longitudinal direction of the vehicle.

15. The vehicle-mounted concrete pump as claimed in claim 14, wherein the profile carriers have an I-shape.

16. The vehicle-mounted concrete pump as claimed in claim 1, wherein the assembly recesses define a series of openings that are accessible from opposite sides of the screw-mounting bar.

17. The vehicle-mounted concrete pump as claimed in claim 16, wherein each screw-mounting channel is accessible from one of the two opposite sides of the screw-mounting bar.

18. The vehicle-mounted concrete pump as claimed in claim 4, wherein each pair of mirror-symmetrically arranged assembly recesses are separated by a central web that extends from top to bottom of the screw-mounting bar.

* * * * *